United States Patent [19] [11] Patent Number: 4,735,998
Itoh et al. [45] Date of Patent: Apr. 5, 1988

[54] METHOD FOR THE PREPARATION OF A CROSSLINKED ORGANIC POLYMER

[75] Inventors: Kunio Itoh; Motoo Fukushima, both of Annaka, Japan

[73] Assignees: Shin-Etsu Chemical Co. Ltd., Tokyo; Nisshin Chemical Industry Co., Ltd., Kukui, both of Japan

[21] Appl. No.: 849,756

[22] Filed: Apr. 9, 1986

[30] Foreign Application Priority Data

Apr. 10, 1985 [JP] Japan ................................ 60-75584

[51] Int. Cl.$^4$ ................................................ C08F 8/00
[52] U.S. Cl. ................................ 525/342; 525/326.5; 525/387; 526/279
[58] Field of Search ............... 526/279; 525/342, 387

[56] References Cited

U.S. PATENT DOCUMENTS

| | | | |
|---|---|---|---|
| 3,274,154 | 9/1966 | Kendrick et al. | 502/227 |
| 3,294,725 | 12/1966 | Findlay et al. | 260/29.2 |
| 3,294,740 | 11/1966 | McVannel | 556/450 |
| 3,657,164 | 4/1972 | Jastrow et al. | 526/279 |
| 3,763,212 | 10/1973 | McEntee et al. | 556/460 |
| 3,846,464 | 11/1974 | Razzano | 556/460 |
| 4,070,414 | 1/1978 | Falender et al. | 260/825 |
| 4,071,557 | 1/1978 | Falender et al. | 260/827 |
| 4,113,690 | 9/1978 | Lewis | 524/266 |
| 4,235,985 | 11/1980 | Tanaka et al. | 526/279 |
| 4,246,389 | 1/1981 | LeBoeuf | 526/279 |
| 4,525,563 | 6/1985 | Shibata et al. | 526/279 |
| 4,605,712 | 8/1986 | Mueller et al. | 526/279 |

Primary Examiner—Joseph L. Schofer
Assistant Examiner—Bernard Lipman
Attorney, Agent, or Firm—Hopgood, Calimafde, Kalil, Blaustein & Judlowe

[57] ABSTRACT

A crosslinkable copolymer is prepared by the copolymerization of a first ethylenically unsaturated monomer and a second monomer substituted by a vinyl-containing cyclic organosilicon group such as

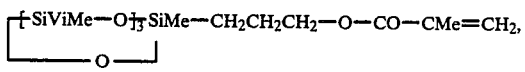

in which Vi and Me denote vinyl and methyl groups, respectively. When such a copolymer is admixed with a crosslinking agent such as an organic peroxide and shaped with heating, the crosslinkable copolymer is crosslinked so that the shaped article is imparted with greatly improved properties.

4 Claims, No Drawings

METHOD FOR THE PREPARATION OF A CROSSLINKED ORGANIC POLYMER

BACKGROUND OF THE INVENTION

The present invention relates to a crosslinkable organic polymer and a method for the preparation of a crosslinked organic polymer or, more particularly, to a method for the preparation of a crosslinked organic polymer from a crosslinkable organic polymer which can be cured by crosslink formation at an advantageously high velocity even in the core portion of a thick body without disadvantages due to the formation of a by-product in the crosslinking reaction.

It is known that various organic polymers can be imparted with improved properties by introducing crosslinkable groups into the molecular structure of the base polymer and bringing the thus obtained crosslinkable polymer under such conditions that the crosslinkable groups can pertain to the crosslinking reaction to form crosslinks between molecules. A variety of crosslinkable groups have been proposed in the prior art and several organic polymers can be crosslinked by utilizing organosilicon groups as the crosslinkable groups introduced into and bonded to the base polymer including an organosilicon group of the formula ≡SiX in an organosilane compound, in which X is a hydrolyzable group, so that, when the thus silane-modified polymer is exposed to a moisture-containing atmosphere, the hydrolyzable groups are hydrolyzed by the atmospheric moisture to form silanol groups followed by the intermolecular silanol condensation reaction to form crosslinks (see, for example, U.S. Pat. Nos. 3,632,557, 3,563,943, 3,471,440 and 3,971,751 and Japanese Patent Publication No. 48-1711).

Although such a silane-modified crosslinkable organic polymer is advantageous in respect of the crosslinkability thereof even at room temperature since the crosslinking reaction solely utilizes the hydrolysis by the atmospheric moisture, the velocity of the crosslinking reaction is relatively low so that a long time is sometimes taken before complete crosslink formation between the polymer molecules or the core portion of a thick body of the polymer is sometimes left uncrosslinked unless the base polymer has good permeability to atmospheric moisture. Further, the crosslinking reaction proceeds by the mechanism of a condensation reaction so that a by-product is always formed and contained in the body of the polymer to cause various adverse influences on the properties of the crosslinked polymer.

SUMMARY OF THE INVENTION

Thus, the method of the present invention for the preparation of a crosslinked polymer without the above described problems and disadvantages in the prior art comprises:

(a) admixing an organic polymer having, in a molecule, at least two vinyl-containing cyclic organosilicon groups represented by the general formula

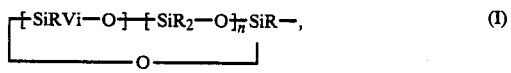

in which Vi is a vinyl group, each of the groups denoted by R is, independently from the others, an atom or group selected from the class consisting of a hydrogen atom, substituted or unsubstituted monovalent hydrocarbon groups, hydroxy group and hydrolyzable groups excepting halogen atoms and the subscript n is a number of 1, 2 or 3 or, preferably, 2, bonded to the carbon atoms as the pendant groups on the organic polymer with an organohydrogenpolysiloxane or an organic peroxide to form a polymeric composition; and (b) heating the polymeric composition at an elevated temperature.

DETAILED DESCRIPTION OF THE PREFERRED EMBODIMENTS

As is understood from the above given summary, the method of the invention characteristically employs an organic polymer having specific cyclic organosilicon pendant groups as the base material which is admixed with a specific crosslinking agent and heated at an elevated temperature to effect the crosslinking reaction. The crosslinking agent is, on one hand, an organic peroxide or, on the other hand, an organohydrogenpolysiloxane, preferably, combined with a catalytic amount of a platinum compound as the catalyst to promote the addition reaction or so-called hydrosilation between the vinyl groups in the cyclic pendant groups on the organic polymer and the silicon-bonded hydrogen atoms in the organohydrogenpolysiloxane. The crosslinking reaction is unaffected by and can readily proceed even in the presence of a siliceous filler such as finely divided fumed silica fillers. Further, the crosslinking reaction proceeds without producing a large amount of by-products responsible for the formation of voids or blisters in the shaped articles so that high productivity is ensured in the preparation of shaped articles of a crosslinked organic polymer.

The crosslinkable polymer used in the method of the invention is prepared by the copolymerization of one or more of ethylenically unsaturated polymerizable monomers, referred to as a non-silicon monomer hereinbelow, as the base component of the monomeric mixture and a relatively small amount of an ethylenically unsaturated comonomer substituted by the organosilicon group represented by the general formula (I), referred to as an organosilicon-substituted monomer hereinbelow, to give the pendant groups on the resultant copolymer. The copolymerization ratio of the non-silicon monomer to the organosilicon-substituted monomer, i.e. the mixing ratio of them in the monomeric mixture should be in the range from 90:10 to 99.99:0.01 or, preferably, from 95:5 to 99.9:0.1 by weight.

The ethylenically unsaturated monomer, i.e. the non-silicon monomer, as the base component of the monomeric mixture is exemplified by vinylic or monoolefinic monomers such as olefins, e.g. ethylene, propylene and butenes, vinyl monomers, e.g. vinyl chloride, vinyl acetate and styrene, esters of acrylic or methacrylic acid, e.g. ethyl acrylate, butyl acrylate and methyl methacrylate, vinylidene monomers, e.g. vinylidene chloride, vinylidene fluoride and vinylidene cyanide, unsaturated nitriles, e.g. acrylonitrile and methacrylonitrile, and dienic monomers such as butadiene, isoprene and chloroprene. These monomers can be used either singly or as a combination of two kinds or more according to need.

Exemplary of the organosilicon-substituted monomer to be copolymerized with the above named ethylenically unsaturated monomer or monomers are those expressed by the following structural formulas, in which R is a hydrogen atom or a methyl group, Vi is a vinyl group and Q is the cyclic organosilicon group represented by the general formula (I):

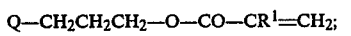

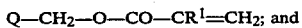

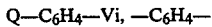

being a 1,4-phenylene group.

In the general formula (I) representing the vinyl-containing cyclic organosilicon group denoted by Q in the above given formulas, the symbol R denotes an atom or group selected from the class consisting of a hydrogen atom, monovalent hydrocarbon groups including alkyl groups, e.g. methyl, ethyl, propyl and butyl groups, alkenyl groups, e.g. vinyl and allyl groups, aryl groups, e.g. phenyl and tolyl groups, and cycloalkyl groups, e.g. cyclohexyl group, as well as those substituted groups obtained by replacing a part or all of the hydrogen atoms in the above named hydrocarbon groups with substituents such as halogen atoms and cyano groups, a hydroxy group and hydrolyzable groups excepting halogen atoms such as alkoxy, acyloxy and substituted aminoxy groups. Preferably, the groups denoted by R are methyl groups when they are not vinyl. The subscript n is a positive number of 1, 2 or 3 but is preferably 2 so that the cyclic structure is that of a tetrasiloxane composed of 8 members of alternating silicon and oxygen atoms.

Preferable examples of the cyclic organosilicon group represented by the general formula (I) include those expressed by the following formulas (A) to (G), in which the symbols Me and Vi denote methyl and vinyl groups, respectively:

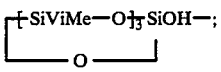 (A)

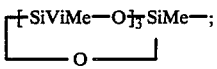 (B)

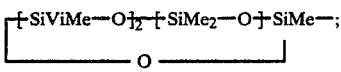 (C)

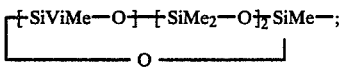 (D)

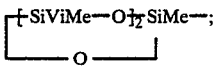 (E)

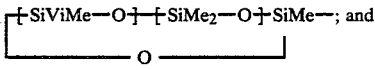 (F)

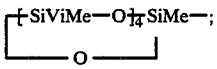 (G)

The copolymerization proceeds by the mechanism of free radical polymerization and can be initiated by various known methods. For example, the copolymerization may take place by merely heating the monomer mixture or by irradiating the monomer mixture with light, e.g. ultraviolet, or high energy radiation, e.g. electron beams and γ-rays. It is important in carrying out the copolymerization that the vinyl groups bonded to the silicon atoms in the cyclic organosilicon group are left intact without pertaining to the copolymerization although such vinyl groups have relatively low activity toward the copolymerization with the ethylenically unsaturated monomers. In this regard, the copolymerization of the monomer mixture should preferably be conducted in the presence of a free radical polymerization initiator such as a peroxide, e.g. ammonium persulfate, or an organic azo compound, e.g. azobisisobutyronitrile, at a temperature of 50° to 150° C. or by use of a redox-type initiator system at a somewhat lower temperature. Such a initiator system of redox-type is conventional in the process of emulsion polymerization and particularly useful in the copolymerization for the preparation of the crosslinkable polymer used in the invention in respect of the absolute inactivity to the vinyl groups bonded to the silicon atoms which otherwise pertain to the polymerization more or less. The emulsifying agent used in this case is not particularly limitative including anionic, cationic and non-ionic surface active agents of which anionic ones are generally preferred in view of the versatility to various kinds of monomers. Non-ionic surface active agents are less versatile in the applicability to various kinds of monomers but preferred in the polymerization involving a hydrophilic monomer such as vinyl acetate and acrylic esters. In short, the emulsifying agent should be adequately selected depending on the nature of the monomer or monomers to be copolymerized. Although the crosslinkability of the copolymer is basically determined by the copolymerization ratio of the monomer having the substituent of the vinyl-containing cyclic organosilicon group, various other parameters may have influences on the properties of the copolymer including the pH of the aqueous polymerization medium, polymerization temperature, conditions of agitation and others.

The crosslinkable copolymeric polymer obtained in the above described manner is then admixed with a crosslinking agent which may be an organic peroxide or an organohydrogenpolysiloxane or a combination of both. The organic peroxide suitable for use is exemplified by benzoyl peroxide, 2,4-dichlorobenzoyl peroxide, dicumyl peroxide, di-tert-butyl peroxide, 2,5-dimethyl-2,5-di(tert-butyl peroxy) hexane, tert-butyl perbenzoate, 1,3-bis(tert-butyl peroxy isopropyl) benzene, cumyl tert-butyl peroxide and the like. The amount of the organic peroxide added to the crosslikable polymer should be in the range from 0.2 to 10 parts by weight per 100 parts by weight of the polymer. The crosslinkable polymer and the organic peroxide are thoroughly mixed together at a temperature at which no substantial decomposition of the peroxide takes place to form a uniform polymeric composition which is molded into a void-free shaped article having elasticity at a temperature of 120° C. or higher depending on the particular method of molding. For example, compression molding of the polymeric composition in a metal mold may be carried out at 120° to 200° C. while a temperature of 120° to 350° C. may be suitable when the composition is molded by the techniques of hot-air extrusion molding.

The vinyl groups directly bonded to the silicon atoms in the organosilicon groups have quite different specificity in reaction from that of the unsaturated groups in ordinary organic polymers. It is known that silicone rubbers containing silicon-bonded vinyl groups are not vulcanizable with sulfur or sulfur compounds as the most conventional vulcanizing agent for organic rubbers. Further, as is known from Japanese Patent Publication No. 55-41704, no graft polymerization of an olefinic monomer takes place on to a vinyl-containing organopolysiloxane even when a mixture of them are admixed with a free radical polymerization initiator and heated to start the polymerization of the monomer only to give a mere blend of the organopolysiloxane and the newly produced organic polymer. Although the reactivity of the silicon-bonded vinyl groups is considerably influenced by the types of the other groups bonded to the silicon atom, the above mentioned specificity of the silicon-bonded vinyl groups is basically a result of the polarity of the siloxane linkage adjacent thereto. The organic polymer to which the organosilicon groups or the siloxane linkages are introduced according to the invention is also imparted with other advantageous properties such as improvements in the cold resistance of the crosslinked polymer and in the dispersion of inorganic fillers incorporated thereinto owing to the moderation of the intermolecular forces.

The organohydrogenpolysiloxane as an alternative class of the crosslinking agent should have at least three hydrogen atoms directly bonded to the silicon atoms in a molecule and is exemplified by those compounds expressed by the following structural formulas, in which the symbols Me, Bu and Ph denote methyl, butyl and phenyl groups, respectively:

Me$_3$Si—O—[SiHMe—O]$_m$SiMe$_e$, m being a positive ingeger not exceeding 10;

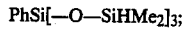

PhSi[—O—SiHMe$_2$]$_3$;

cyclic tetramer of

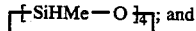

[—SiHMe—O—]; and and cyclic tetramer of

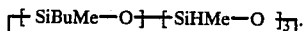

[—SiBuMe—O—][—SiHMe—O—].

Copolymeric organohydrogenpolysiloxanes composed of monofunctional siloxane units of the formula (Me$_2$HSiO$_{0.5}$) and tetrafunctional siloxane units of the formula (SiO$_2$) are also suitable. In view of the compatibility or miscibility with the crosslinkable polymer, the organohydrogenpolysiloxane should have a relatively low degree of polymerization of, for example, 10 or lower. The amount of the organohydrogenpolysiloxane to serve as a crosslinking agent should be in the range from 0.01 to 10 parts by weight per 100 parts by weight of the crosslinkale polymer. When an organohydrogenpolysiloxane is used as the crosslinking agent, the polymeric composition should preferably be admixed with a platinum compound such as chloroplatinic acid and an adduct or complex thereof with an alcohol, olefin, vinylsiloxane and the like as a catalyst to promote the addition reaction betweeen the silicon-bonded hydrogen atoms in the organohydrogenpolysiloxane and the silicon-bonded vinyl groups in the polymer. The crosslinking reaction can proceed even at room temperature at an adequate velocity to give a crosslinked polymer having elasticity.

The polymeric composition may optionally be admixed according to need with a filler including particulate ones such as various kinds of siliceous fillers, calcium carbonate, clay, talc, aluminum hydroxide, alumina, boron oxide, titanium dioxide, iron oxide, graphite powder, carbon black and the like and fibrous ones such as glass fibers, carbon fibers and the like. The bonding strength between the polymer and the surface of these fillers can be enhanced by incorporating a carbon-functional organosilane compound such as vinyl trimethoxy silane, 3-mercaptopropyl trimethoxy silane, 3-methacryloxypropyl trimethoxy silane, 3-glycidyloxypropyl trimethoxy silane and the like. Other additives conventionally added to polymeric compositions may of course be added thereto including curing accelerators, crosslinking aids, coloring agents, antioxidants, ultraviolet absorbers and others.

In the following, the method of the invention is described in more detail by way of examples preceded by the description of the procedures for the preparation of some of the organosilicon substituted monomers, in which the expression of "parts" always refers to "parts by weight".

PREPARATION 1.

A reaction mixture was prepared by mixing 241 g of 3-methacryloxypropyl methyl dichlorosilane, 258 g of 1,3,5-trimethyl-1,3,5-trivinyl cyclotrisiloxane and 5 g of hexamethyl phosphoric triamide and agitated at room temperature for 2 hours. The reaction mixture was admixed with 400 g of toluene and the mixture was added dropwise into 1 liter of water. The organic solution obtained by phase separation was repeatedly washed with water and dried followed by distillation under reduced pressure to give 244 g of a fraction boiling at 141° C. under a pressure of 3 mmHg as a product, which had a density d$^{25}$$_4$ of 1.025 and a refractive index at 25° C. of 1.4463 and could be identified to be an organosilicon-substituted monomer expressed by the formula

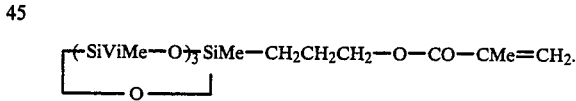

[—SiViMe—O—]$_3$SiMe—CH$_2$CH$_2$CH$_2$—O—CO—CMe=CH$_2$.
[——O——]

The above mentioned yield of the product was 55% of the theoretical value.

PREPARATION 2.

3-Acrylaminopropyl methyl dichlorosilane of the formula (Vi—CO—NH—CH$_2$CH$_2$CH$_2$)(Me)SiCl$_2$ was synthesized according to the procedure described in Journal of the American Chemical Society, volume 75, page 995 (1953) and 114 g of this silane were admixed with 129 g of 1,3,5-trimethyl-1,3,5-trivinyl cyclotrisiloxane and 2 g of hexamethyl phosphoric triamide to form a reaction mixture. The reaction and subsequent processing of the reaction mixture were performed in substantially the same manner as in Preparation 1 described above to give 88 g of a product boiling at 144° C. under a pressure of 0.1 mmHg which could be identified to be an organosilicon-substituted monomer expressed by the formula

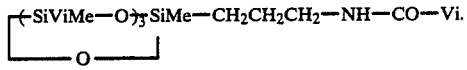

The above mentioned yield of the product was 40% of the theoretical value.

EXAMPLE 1.

Into an autoclave of 1-liter capacity equipped with a stirrer were introduced 215 g of vinyl acetate, 4.3 g of an organosilicon-substituted propyl methacrylate of the formula

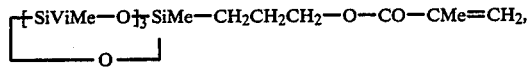

100 g of tert-butyl alcohol and 0.5 g of azobisisobutyronitrile to form a polymerization mixture, into which nitrogen gas was blown for about 3 minutes to replace the dissolved oxygen with nitrogen and the atmosphere inside the autoclave was replaced with nitrogen by three times repetition of pressurization up to 10 kg/cm² with nitrogen and release of the pressure. Thereafter, the polymerization mixture in the autoclave was heated at 65° C. and kept at the temperature for 3 hours under pressurization with ethylene up to a pressure of 40 kg/cm² to effect copolymerization of the monomers. After completion of the polymerization, the mixture was cooled to room temperature and the unpolymerized ethylene gas was purged. The polymerization mixture taken out of the autoclave was poured into a large volume of water to precipitate the polymer which was purified by dissolving in acetone and reprecipitating with addition of water to give 188 g of a polymeric product, which is referred to as the copolymer I hereinbelow.

For comparison, the same polymerization procedure as above was repeated excepting omission of the organosilicon-substituted monomer in the polymerization mixture to give 178 g of a polymeric product, which is referred to as the copolymer II hereinbelow.

Each a 100 g portion of the thus prepared copolymers I and II was admixed with 35 g of a finely divided precipitated silica filler (Nipsil, a product by Nippon Silica Co.), 5 g of zinc oxide and 0.7 g of vinyl tris(2-methoxyethoxy) silane and the mixture was uniformly milled on a two-roller mill followed by heating on the mill for 30 minutes at 100° C. to remove the moisture content therein followed by cooling of the mill to 20° C. and further addition and mixing of 2.5 g of a pasty 1:1 by weight compound composed of 2,2-bis(tert-butyl peroxy) butane and a siliceous filler for 5 minutes into a uniform compound.

The compound was shaped by compression molding at 160° C. for 15 minutes under a pressure of 70 kg/cm² into a sheet of 2 mm thickness, of which mechanical properties were determined according to the procedure specified in JIS K 6301 to give results of: hardness, JIS, of 55; tensile strength of 85 kg/cm² tear strength of 20 kg/cm; and ultimate elongation of 250% for the sheet of the compound formulated with the copolymer I while the mechanical properties of the sheet of the compound formulated with the copolymer II could not be determined due to the unduly low hardness to give no possibility of measurements.

EXAMPLE 2.

An aqueous emulsion prepared from 332.1 g of styrene, 33.2 g of an organosilicon-substituted propyl acrylate of the formula

[-SiViMe—O]₃SiMe—CH₂CH₂CH₂—O—CO—Vi,
[——O——]

44.1 g of a non-ionic surface active agent (Triton X-405, a product by Rohm & Haas Co.), 7.3 g of sodium laurylsulfate, 34.2 g of potassium persulfate and 583.2 g of water was introduced into an autoclave of 1-liter capacity and, after replacement of the air inside the autoclave by three times repetition of pressurization to 10 kg/cm² with nitrogen gas and release of the pressure, the emulsion under agitation was heated at 70° C. for 2 hours to effect the copolymerization reaction. The thus obtained latex contained 15% by weight of the non-volatile matter. The copolymer contained in the thus obtained latex is referred to as the copolymer III hereinbelow.

The latex of the copolymer III in an amount varied as indicated in Table 1 below was mixed with 100 parts of a commercially available SBR latex containing 25% by weight of a 7:3 by weight copolymer of butadiene and styrene and the polymeric mixture obtained by passing the latex mixture through a high-pressure homogenizer with addition of a saturated aqueous solution of calcium chloride to effect co-coagulation followed by repeated washing with water and drying was uniformly admixed with 2 parts of a dicumyl peroxide paste composed of the peroxide and a siliceous filler in a 1:1 by weight ratio, 2 parts of casein, 5 parts of zinc oxide and 3 parts of a vulcanization accelerator (Setsit #5, a product by R.T. Vanderbilt & Co.). The thus prepared polymeric composition was shaped by compression molding at 60° C. under a pressure of 70 kg/cm₂ for 15 minutes into a sheet of 2 mm thickness, of which the mechanical properties and water absorption were measured to give the results shown in Table 1.

TABLE 1

| | | | | |
|---|---|---|---|---|
| Latex of copolymer III, parts | 0 | 10 | 15 | 20 |
| Tensile stress at 300% elongation, kg/cm² | 9 | 12 | 16 | 18 |
| Tensile stress at 500% elongation, kg/cm² | 26 | 34 | 43 | 45 |
| Hardness, Shore A | 52 | 55 | 62 | 65 |
| Tensile strength, kg/cm² | 140 | 143 | 155 | 132 |
| Tear strength, kg/cm | 7 | 11 | 13 | 14 |
| Ultimate elongation, % | 700 | 730 | 690 | 650 |
| Permanent compression set, % | 12 | 15 | 17 | 18 |
| Water absorption, % | 33 | 12 | 13 | 12 |

EXAMPLE 3.

A polymeric latex was prepared in substantially the same manner as in Example 2 by heating an aqueous emulsion composed of 70 g of butadiene, 30 g of acrylonitrile, 180 g of distilled water, 0.5 g of an N-[3-(organosilicon-substituted) propyl] acrylamide of the formula

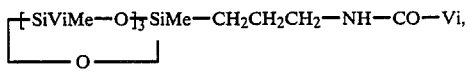

4.5 g of soap flakes, 0.6 g of stearic acid, 0.2 g of tert-dodecyl mercaptan, 0.35 g of 100% hydrogen peroxide, 0.02 g of iron(II) sulfate, 0.1 g of sodium pyrophosphate and 0.3 g of potassium chloride under agitation at 30° C. for 24 hours. After cooling, the polymerization mixture admixed with 0.1 g of hydroquinone was freed from unreacted butadiene by flashing under reduced pressure and from unreacted acrylonitrile in a vacuum concentrator to give a polymeric latex. The copolymer contained in this latex is referred to as the copolymer IV hereinbelow. For comparison, the same procedure as above was repeated excepting the omission of the organo-silicon-substituted acrylamide monomer in the starting emulsion to give a similar latex. The copolymer contained in this comparative latex is referred to as the copolymer V hereinbelow.

A 100 g portion of the latex containing the copolymer IV was uniformly admixed with 3 g of the same dicumyl peroxide paste as used in Example 2, 5 g of zinc oxide and 3 g of the same vulcanization accelerator as used in Example 2 and freed from water by standing at 25° C. for 8 hours to give a polymeric composition, which was shaped by compression molding at 160° C. for 15 minutes under a pressure of 70 kg/cm² into a sheet of 1 mm thickness. The thus obtained cured sheet had a tensile strength of 282 kg/cm² and ultimate elongation of 385% while the sheet prepared of the comparative copolymer V in the same manner as above had a tensile strength of only 32 kg/cm² and ultimate elongation of 1960%.

EXAMPLE 4

Emulsion copolymerization of ethyl acrylate and an organosilicon-substituted monomer was performed in a similar manner to Example 2. Thus, 200 parts of water and 2 parts of sodium laurylsulfate were introduced into an autoclave and, after replacement of the air inside the vessel with nitrogen gas, the aqueous solution kept at 30° C. was admixed with 0.1 part of ammonium persulfate, 0.1 part of sodium hydrogensulfite and 0.001 part of iron(II) sulfate. Thereafter, a mixture composed of 99 parts of ethyl acrylate and 1 part of an organosilicon-substituted monomer expressed by the formula

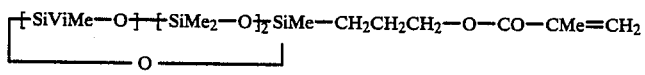

was added to the aqueous solution in the vessel over a period of 3 hours under agitation followed by further continued agitation for an additional hour while the temperature of the polymerization mixture was kept at 30° C. throughout.

The thus obtained latex-like emulsion was subjected to salting-out by adding a saturated aqueous solution of calcium chloride to coagulate the copolymer which was repeatedly washed with water and dried. The yield of the copolymer, referred to as the copolymer VI hereinbelow, was 99.5% and the Mooney viscosity [$ML_{1=4}$ (100° C.)] of the copolymer was 5.1.

A base compound was prepared by uniformly blending 100 parts of the copolymer VI, 40 parts of a finely divided silica filler, 1 part of stearic acid and 5 parts of zinc oxide on a two-roller mill at room temperature and then milled on the roller mill heated at 110° C. for 30 minutes to remove the moisture contained in the silica filler. After cooling, each a 100 parts portion of the base compound was admixed either with 1.5 parts of a pasty compound containing 50% by weight of 2.4-dichlorobenzoyl peroxide or a combination of 1 part of a trimethylsilyl-terminated methylhydrogenpolysiloxane of the formula $Me_3Si-O-(SiHMe-O)_{10}SiMe_3$, 0.1 part of an isopropyl alcohol solution of chloroplatinic acid in a concentration of 2% by weight as platinum and 0.2 part of 2-ethynylpropanol-2 as a reaction moderator. These polymeric compositions are referred to as the peroxide-vulcanizable and addition-vulcanizable compositions, respectively, hereinbelow.

These compositions were each shaped into a form of sheet which was subjected to hot-air vulcanization by heating in an oven at 250° C. for 3 minutes so that the sheet was vulcanized into a rubber sheet free from blistering. Several physical properties of these vulcanized rubber sheets were measured according to the procedure spcified in JIS K 6301. The measurements were performed of the rubber sheets as vulcanized, after the oil resistance test by dipping for 70 hours in the #3 oil at 150° C. and after the heat resistance test for 70 hours at 180° C. to give the results shown in Table 2 below.

TABLE 2

| | | Peroxide-vulcanizable composition | Addition-vulcanizable composition |
|---|---|---|---|
| As vulcanized | Hardness, JIS | 62 | 58 |
| | Tensile strength, kg/cm² | 133 | 108 |
| | Ultimate elongation, % | 560 | 450 |
| | Tear strength, kg/cm | 43 | 38 |
| | Impact resilience, % | 19 | 18 |
| | Permanent compression set after 70 hours at 150° C., % | 77 | 40 |
| After oil resistance test | Change in hardness, point | −10 | −11 |
| | Change in tensile strength, % | 0 | −5 |
| | Change in ultimate elongation, % | −22 | −40 |
| | Change in volume, % | +17 | +18 |
| After heat resistance test | Change in hardness, point | +10 | +10 |
| | Change in tensile strength, % | +15 | +31 |
| | Change in ultimate elongation, % | −30 | −35 |

What is claimed is:

1. A crosslinkable polymeric composition which comprises:
   (a) an organic polymer having, in a molecule, at least two vinyl-containing cyclic organosilicon groups represented by the general formula

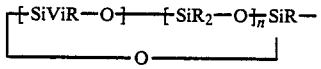

in which Vi is a vinyl group, each of the groups denoted by R is, independently from the others, a methyl group or a vinyl group and the subscript n is a number of 1, 2, or 3, bonded to the carbon atoms as the pendant groups of the organic polymer through a divalent linking group selected from the class consisting of: $-CH_2-CH_2-CH_2-NH-CO-$; $CH_2-OCO-$; and $-C_6H_4-$; and
   (b) a crosslinking agent selected from the class consisting of organic peroxide, organohydrogenpolysiloxane, and a combination of organic peroxide and organohydrogenopolysiloxane.

2. The crosslinkable polymeric composition as claimed in claim 1 wherein the crosslinking agent is an organic peroxide.

3. The crosslinkable polymeric composition as claimed in claim 1 wherein the vinyl-containing cyclic organosilicon group is a group expressed by the structural formula

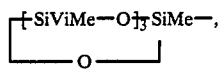

in which Vi and Me denote vinyl and methyl groups, respectively.

4. The crosslinkable polymeric composition as claimed in claim 2 wherein the amount of the organic peroxide is in the range from 0.2 to 10 parts by weight per 100 parts by weight of the organic polymer.

* * * * *